United States Patent

Ma

[11] Patent Number: 6,020,941
[45] Date of Patent: Feb. 1, 2000

[54] STEREOGRAPHIC LIQUID CRYSTAL DISPLAY EMPLOYING SWITCHABLE LIQUID CRYSTAL MATERIALS OF TWO POLARITIES IN SEPARATE CHANNELS

[75] Inventor: Yao-Dong Ma, Richardson, Tex.

[73] Assignee: Advanced Display Systems, Inc., Amarillo, Tex.

[21] Appl. No.: 09/022,518

[22] Filed: Feb. 12, 1998

[51] Int. Cl.[7] .............................. G02F 1/133; G02F 1/339; G02B 27/26

[52] U.S. Cl. .......................... 349/15; 349/153; 349/155; 349/175

[58] Field of Search .................. 349/15, 73, 98, 349/156, 84, 153, 175; 359/462, 465

[56] References Cited

U.S. PATENT DOCUMENTS

| | | | |
|---|---|---|---|
| 4,472,737 | 9/1984 | Iwasaki | 358/88 |
| 4,983,004 | 1/1991 | Takeya et al. | 350/3.66 |
| 5,015,074 | 5/1991 | Clerc et al. | 349/79 |
| 5,113,272 | 5/1992 | Reamey | 359/53 |
| 5,274,481 | 12/1993 | Kim | 349/86 |
| 5,686,975 | 11/1997 | Lipton | 349/15 |
| 5,689,316 | 11/1997 | Hattori et al. | 349/74 |
| 5,699,184 | 12/1997 | Hall | 359/465 |
| 5,764,317 | 6/1998 | Sadovnik et al. | 349/5 |
| 5,784,139 | 7/1998 | Chigrinov et al. | 349/117 |

*Primary Examiner*—Kenneth Parker
*Attorney, Agent, or Firm*—Hitt Chwang & Gaines, P.C.

[57] ABSTRACT

A stereographic liquid crystal display (LCD) and various methods of manufacturing and operating such stereographic LCD. In one embodiment, the LCD includes: (1) first and second substrates having a cell wall structure located in an interstice therebetween that defines first and second sets of independent cells in the LCD; (2) a first controllable liquid crystal (CLC) material located in the first plurality of independent cells, the first CLC material selectively exhibiting an "on" state and an "off" state and having a first polarity when in the "on" state; and (3) a second CLC material located in the second plurality of independent cells, the second CLC material selectively exhibiting an "on" state and an "off" state and having a second polarity when in the "on" state. The first and second CLC materials are selectively driveable to cause the LCD to present a stereogram to a viewer when viewed through first and second polarizing lenses having polarities corresponding to the first and second polarities of the first and second CLC materials, respectively.

23 Claims, 4 Drawing Sheets

STEREOGRAPHIC LIQUID CRYSTAL DISPLAY EMPLOYING SWITCHABLE LIQUID CRYSTAL MATERIALS OF TWO POLARITIES IN SEPARATE CHANNELS

TECHNICAL FIELD OF THE INVENTION

The present invention is directed, in general, to liquid crystal displays ("LCDs") and, more specifically, to a stereographic LCD and methods of manufacturing and operating an LCD to yield stereographic images.

BACKGROUND OF THE INVENTION

The development of improved liquid crystal ("LC") flat-panel displays is an area of very active research, driven in large part by the proliferation of and demand for portable electronic appliances, including computers and wireless telecommunications devices. Moreover, as the quality of LC displays improves, and the cost of manufacturing declines, it is projected that LC displays ("LCD"s) may eventually displace conventional display technologies, such as cathode-ray-tubes.

One aspect of LCDs, to which significant research has been directed in recent years, is the demand for such displays to provide full-color images. It is quite possible that LCDs capable of displaying full-color images, at full-motion video rates, will eventually displace conventional cathode-ray tubes in television and computer display applications. In addition, it is desirable that LCDs be capable of displaying stereographic, or "three-dimensional" "virtual reality" systems, which can be used not only for entertainment purposes, but as tools in such diverse fields as medicine, manufacturing, and service/repair. Several characteristics of conventional LCD materials and methods of manufacturing such displays, however, present barriers to an efficient method of manufacturing 3-D displays.

LCDs are constructed by trapping a thin film of LC between two substrates of glass or transparent plastic. The conventional method of trapping the LC between the substrates is to first join the substrates and then introduce a LC into the interstitial region(s) formed therebetween. The substrates are usually manufactured with transparent electrodes, typically made of indium tin oxide ("ITO"), to which electrical "driving" signals are coupled. The driving signals induce an electric field which can cause a phase change or state change in the LC material; the LC exhibiting different light-reflecting characteristics according to its phase and/or state.

Conventional LCD manufacturing techniques introduce a LC material having an intrinsic polarity into the region between the display substrates. For 3-D images, however, it is desirable that the LCD include regions of LC material having different polarities, such as left-hand and right-hand circular polarities; the regions of left-hand circular polarity can be used to display a first image simultaneously with the display of a second image using the regions of right-hand circular polarity. An observer can use, for example, a pair of eyeglasses having left and right polarizing lenses corresponding to the polarities of the first and second images to see the stereographic image composed of the first and second images. The practical difficulty of manufacturing 3-D LCD displays, using conventional techniques, is that the LC material introduced into the region between the substrates has the same polarity for each individual microscopic pixel (or sub-pixel) of the display.

Therefore, what is needed in the art is a LCD wherein LC materials having different polarities may be introduced into different regions, or cells, between the LCD substrates. There is a further need in the art for an easily manufacturable stereographic LCD display system.

SUMMARY OF THE INVENTION

To address the above-discussed deficiencies of the prior art, it is a primary object of the present invention to provide a stereographic liquid crystal display ("LCD") that overcomes the deficiencies of the prior art described above.

In the attainment of the above-described primary object, the present invention provides a stereographic LCD and various methods of manufacturing and operating such stereographic LCD. In one embodiment, the LCD includes: (1) first and second substrates having a cell wall structure located in an interstice therebetween that defines first and second sets of independent cells in the LCD; (2) a first controllable liquid crystal (CLC) material located in the first plurality of independent cells, the first CLC material selectively exhibiting an "on" state and an "off" state and having a first polarity when in the "on" state; and (3) a second CLC material located in the second plurality of independent cells, the second CLC material selectively exhibiting an "on" state and an "off" state and having a second polarity when in the "on" state. The first and second CLC materials are selectively driveable to cause the LCD to present a stereographic image to a viewer when observed through first and second polarizing lenses having polarities corresponding to the first and second polarities of the first and second CLC materials, respectively. In one embodiment, the first and second controllable liquid crystal materials are cholesteric liquid crystals, which have the characteristic of multi-stability.

The present invention therefore provides an LCD that can produce stereographic, or "three-dimensional," images to a viewer. When a viewer observes the stereographic image with appropriate polarizing filters (such as may be provided in the form of eyeglasses), light of one polarization is provided to one eye and light of another polarization is provided to the other eye. Depending upon what pictorial information is provided to the LCD, the viewer may perceive the result as a three-dimensional image, significantly enhancing the utility and aesthetic appeal of the image.

As used herein, "on" and "off" refer to the relative states of local domains within the liquid crystal material. Those skilled in the art recognize that each local domain of a liquid crystal may be composed of molecules in both the planar ("on") and focal-conic ("off") states, or "textures." A multi-stable cholesteric liquid crystal is capable of displaying "gray scale" images, wherein each particular region, or "pixel," can be driven to a desired gray scale level by selectively forcing the transition of liquid crystal molecules from the planar to the focal-conic texture, and vice versa; a bi-stable CLC display being capable of exhibiting two states. Because each display pixel may be composed of molecules in the planar and focal-conic textures, the light reflection and transmission characteristics for both the "on" and "off" states may actually occur simultaneously in a display pixel; the resulting appearance of each pixel is a composite of the two states. For example, if a substantial portion of the molecules in a local domain are in the planar texture, the pixel appearance will correspond to one extreme of the "gray scale," or relative intensity; if a substantial portion of the molecules in a local domain are in the focal-conic texture, the pixel appearance will correspond to the other extreme of the gray scale; intermediate gray scale levels corresponding to the relative proportion of molecules in the planar and focal-conic textures.

In one embodiment of the present invention, the first and second sets of independent cells form "columns" of the LCD. Alternatively, the first and second sets of independent cells may form "rows" of the LCD.

In one embodiment of the present invention, the cell wall structure that defines the first and second sets of independent cells is a serpentine wall structure located in the interstice between the two display substrates, the first and second sets of independent cells having fluid fill ports on opposing edges of the substrates. The cell wall structure may be of a type disclosed in co-pending U.S. application Ser. No. 09/026, 631, filed on Feb. 20 1998, entitled "Substrate for a Multicolor Liquid Crystal Display and Method of Manufacture Thereof," incorporated herein by reference; the present invention, however, is not restricted to a particular cell wall structure.

In one embodiment of the present invention, a number of the first set of independent cells equals a number of the second set of independent cells; i.e., the total image area of the LCD is roughly evenly divided between the first and second sets of independent cells.

In one embodiment of the present invention, a number of the first set of independent cells equals a horizontal resolution of the stereographic display. In an embodiment to be illustrated and described, the total number of independent cells is twice the horizontal resolution of the stereographic display. When viewed through appropriate polarizing lenses, each eye receives an image having the horizontal resolution of the stereographic image.

In one embodiment of the present invention, the LCD further comprises a conductive matrix located on the first and second substrates. The conductive matrix defines pixel, or sub-pixel, locations of the LCD and provides a path for drive voltages to be conveyed to the pixel locations. Those skilled in the art are familiar with the structure and operation of conductive matrices (such as those composed of indium tin oxide). The present invention can take advantage of conventional conductive matrices to define and drive pixel locations of the LCD.

In a related embodiment, the LCD further comprises display driver circuitry, coupled to the conductive matrix. The display driver circuitry provides a drive signal to each of the pixel locations whereby each pixel location may be selectively driven to the "on" state or the "off" state. The display driver circuitry may be of the type disclosed in co-pending U.S. Pat. No. 5,933,203, filed on Jan. 8, 1997, entitled "Apparatus for and Method of Driving a Cholesteric Liquid Crystal Flat Panel Display" and incorporated herein by reference. Of course, the present invention is not restricted to this particular type of display driver circuitry.

In one embodiment of the present invention, the first and second substrates are flexible. In a more specific embodiment, the first and second substrates are composed of plastic. Although flexible substrates render the LCD more rugged than inflexible substrates (such as glass), the present invention is not confined to a particular type of substrate.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

Those skilled in the art recognize that ambient (i.e. "white") light is composed of randomly-polarized light waves and that, theoretically, 50% of the light is right-circularly polarized and 50% is left-circularly polarized. When a liquid crystal ("LC") in the "on" state (i.e., "planar" texture) is illuminated with ambient light, the LC reflects light that has the same handedness as the LC and that is within an intrinsic spectral bandwidth centered about a wavelength $\lambda_0$; all other wavelengths of incident light, and light of opposite polarity, is transmitted through the LC. The wavelength $\lambda_0$ may be within the infra-red ("invisible") or color ("visible") light spectrum. By varying the proportion of chiral compound present in the LC, this selective reflection can be achieved for any wavelength $\lambda_0$ within the infra-red and color spectrums. When the LC is in the "off" state (i.e., "focal-conic" texture), the LC optically scatters all wavelengths of incident light.

Figure 1:
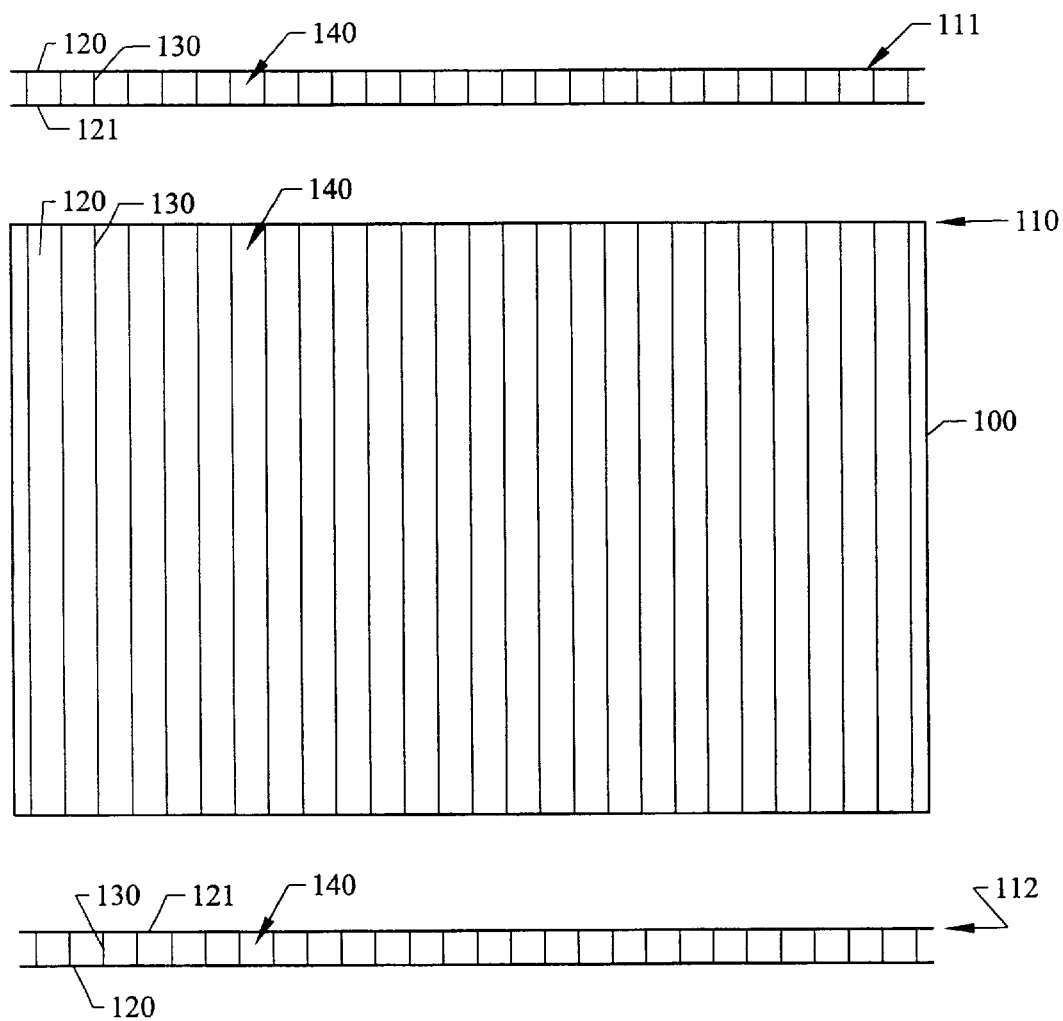
FIG. 1 illustrates frontal and edge views of a prior art substrate having a cell wall structure that defines a plurality of non-independent cells.

Referring initially to FIG. 1, illustrated are a frontal view 110 and edge views 111, 112 of a prior art substrate 100 having a cell wall structure that defines a plurality of non-independent cells; those skilled in the art will recognize that the scale of the illustrations provided herein is much larger than the typical dimensions of practical liquid crystal displays. As shown in the frontal view 110, the substrate 100 has a substantially planar base 120 having a plurality of spacing elements, or cell walls, generally designated 130, distributed on the surface of the base 120. The cell walls 130 are substantially parallel to each other and extend above the surface of the base 130 to a height equal to a preferred cell gap when mated to a second substrate 121, as shown in edge views 111, 112. The spacing between adjacent cell walls 130 is a function of a desired size of a picture element, or "pixel."

As shown in the edge views 111 and 112, when the substrate 100 is mated to a second substrate 121, the cell walls 130 define a plurality of "non-independent" cells, generally designated 140. As used herein, "non-independent" refers to the fact that the cells, or sets of cells, cannot be independently filled with different liquid crystal ("LC") materials, due to the generally very close spacing, e.g., 2 μm, between adjacent cells. Thus, the substrate 100 cannot be used to provide an LCD having regions of LC materials having different polarities. It is an object of the present invention to provide a substrate structure that allows cells to be selectively-filled with liquid crystal materials having different polarities, whereby a LCD display capable of displaying a stereographic image may be easily fabricated.

Those skilled in the art are familiar with various techniques for manufacturing the prior art substrate 100, having a plurality of cell walls 130 on a base 120. For example, cell walls may be formed using photoresist material bonded to a planar base, as disclosed in U.S. Pat. No. 4,720,173, incorporated herein by reference. Alternatively, U.S. Pat. No. 5,268,782, also incorporated herein by reference, discloses a micro-ridged, polymeric LCD substrate having cell walls, or "spacing elements," physically and chemically integral with a substrate. The principles of the present invention are not limited to any particular method of forming the cell walls on a substrate; the scope of the claims recited hereinafter is intended to cover the novel cell wall structures described hereinafter, without regard to how such structures are fabricated on a substrate.

Figure 2:
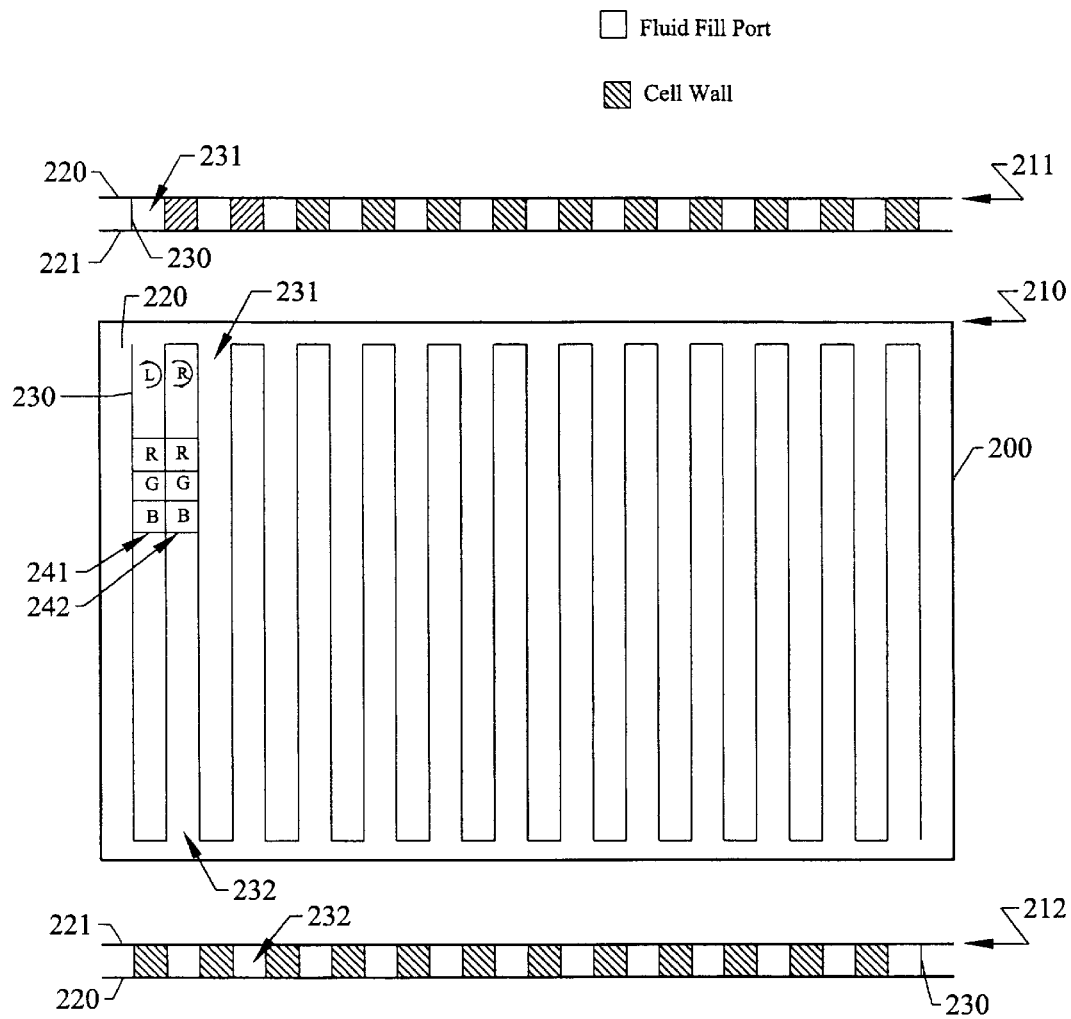
FIG. 2 illustrates frontal and edge views of a first exemplary substrate, having a cell wall structure that defines two sets of independent cells, for use in a stereographic liquid crystal display according to the principles of the present invention.

Turning now to FIG. 2, illustrated are a frontal view 210 and edge views 211, 212 of an exemplary substrate 200, having a cell wall structure that defines two sets of independent cells, for use in a stereographic liquid crystal display according to the principles of the present invention. As shown in the frontal view 210, the substrate 200 has a substantially planar base 220 having a cell wall structure 230 distributed on the surface of the base 220. The cell wall structure 230 consists of a single serpentine wall that defines first and second sets of independent cells, generally designated 231 and 232, having corresponding independent fluid fill ports located at opposite edges of the substrate 200 when bonded to an opposing substrate 221, as shown in edge views 211, 212. The cell wall structure 230 extends above the surface of the base 220 to a height equal to a preferred cell gap when mated to the second substrate 221, as shown in edge views 211, 212; the spacing between adjacent cell walls is a function of a desired size of a picture element, or "pixel."

As shown in the edge views 211 and 212, when the substrate 200 is mated to a second substrate 221, the cell wall structure 230 defines two sets of "independent" cells. As used herein, "independent" refers to the fact that each set of cells 231 and 232 can be filled independently with different liquid crystal ("LC") materials. For example, the set of independent cells 231 can be filled with a first liquid crystal material using a conventional vacuum-filling method, and then sealed using, for example, an epoxy. The set of independent cells 232 can then be filled with a second liquid crystal material, again using a conventional vacuum-filling method, and then sealed. Alternatively, if the substrates 220 and 221 are flexible, both sets of independent cells 231 and 232 may be filled simultaneously by placing the bonded substrates in a vacuum, flexing the substrates such that the fluid fill ports on either end are immersed in separate reservoirs of different liquid crystal materials, and then removing the vacuum to simultaneously draw liquid crystal material by capillary action into both sets of independent cells.

In one embodiment, the first and second liquid crystal materials, or "fill fluids," introduced into the sets of independent cells 231 and 232, respectively, have first and second polarities, respectively. For example, the liquid crystal material introduced into the first set of independent cells 231 may have the characteristic of left-hand circular polarity when in the "on" state, and the liquid crystal material introduced into the second set of independent cells 232 may have the characteristic of right-hand circular polarity when in the "on" state.

The substrate 200 can be used to form a liquid crystal display capable of displaying simultaneously two interleaved images. For example, a first set of pixels can be formed from portions of the display corresponding to the left-hand circular polarity liquid crystal material, and a second set of pixels can be formed from portions of the display corresponding to the right-hand circular polarity liquid crystal material. By selectively driving the first and second set of pixels to display, for example, two slightly different images, the liquid crystal display can be used to present a stereogram to a viewer when viewed through first and second polarizing lenses having polarities corresponding to the first and second polarities, respectively.

In one embodiment, a first set of pixels 241 (one shown) is comprised of adjacent portions, or "sub-pixels," of the first set of independent cells 231, and a second set of pixels 242 (one shown) is comprised of adjacent portions, or "sub-pixels," of the second set of independent cells 232. In a related embodiment, the sub-pixels comprising each pixel correspond to the colors red, green, and blue, whereby a resulting liquid crystal display is capable of displaying full-color images; those skilled in the art are familiar with the capability of displaying full-color images by combining sub-pixels of different colors to provide a pixel capable of displaying a range of colors that is a function of the color and relative intensities of each sub-pixel.

In one embodiment, the sub-pixels correspond to different colored regions of a color filter; those skilled in the art are familiar with the structure and use of color filters to provide for full-color displays. The principles of the present invention are not limited, however, to color displays; the scope of the claims recited hereinafter is intended to cover all liquid crystal displays having at least two sets of independent cells containing liquid crystal materials of different polarities.

The location of each pixel, and/or sub-pixel, can be defined by the location of transparent electrodes (not shown) located on each substrate. Those skilled in the art are familiar with the use of transparent electrodes, such as indium tin oxide ("ITO"), with liquid crystal displays. Depending on the method used to fabricate the cell wall structure 230, the transparent electrodes may be applied to the substrate 200 either before or after the formation of the cell wall structure. For example, photoresist and/or vapor deposition techniques may be employed; the principles of the present invention, however, are not restricted to a particular method of forming the transparent electrodes on the substrates. In one embodiment, the transparent electrodes are arranged such that each column of pixels of the liquid crystal display is formed from adjacent ones of the independent cells 231 and 232. Alternatively, adjacent ones of the independent cells 231 and 232 may form a row of pixels. Those skilled in the art will conceive of various alternative pixel architectures; the principles of the present invention are not limited to a particular pixel, or sub-pixel, format, all such formats being within the scope of the claims recited hereinafter.

Figure 3:
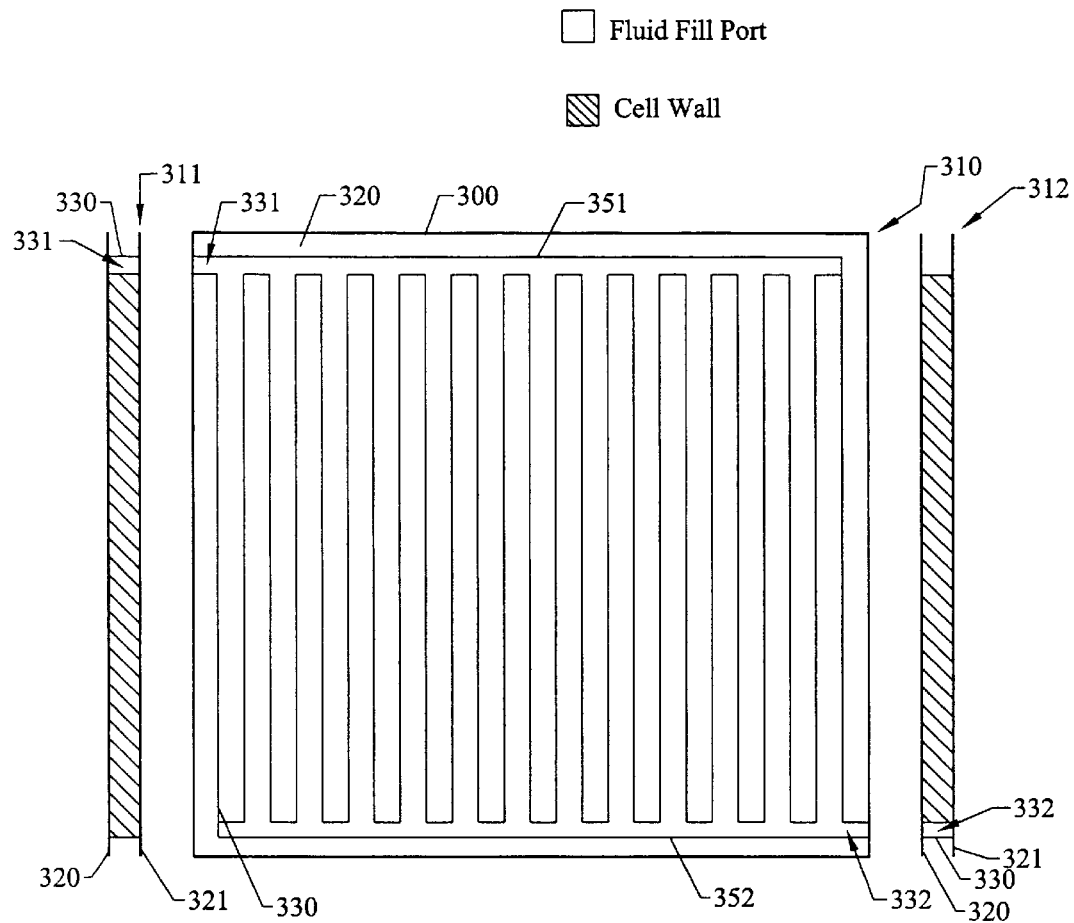
FIG. 3 illustrates frontal and edge views of a second exemplary substrate, having a cell wall structure that defines two sets of independent cells, for use in a stereographic liquid crystal display according to the principles of the present invention.

From the foregoing, those skilled in the art will recognize that the present invention introduces the novel capability to independently fill sets of independent cells 231 and 232 with liquid crystal materials having different polarities. Thus, a liquid crystal display capable of displaying stereographic images can be fabricated. The principles of the present invention are not limited to a specific cell wall structure such as that illustrated in FIG. 2; FIG. 3, described hereinafter, discloses a second exemplary substrate that defines sets of independent cells. Those skilled in the art will conceive of still other cell wall structures suitable to provide the capability of displaying stereographic images; all such cell wall structures are intended to be within the scope of the claims recited hereinafter.

Turning now to FIG. 3, illustrated are a frontal view 310 and edge views 311, 312 of a second exemplary substrate 300, having a cell wall structure that defines two sets of independent cells 331, 332, for use in a stereographic liquid crystal display according to the principles of the present invention. The substrate 300 is substantially similar to the substrate 200, except that the cell wall structure 330 provides additional cell wall portions 351 and 352 that effectively integrate the fluid fill ports for the first and second sets of independent cells 331 and 332, respectively, into corresponding single fluid fill ports.

Figure 4:
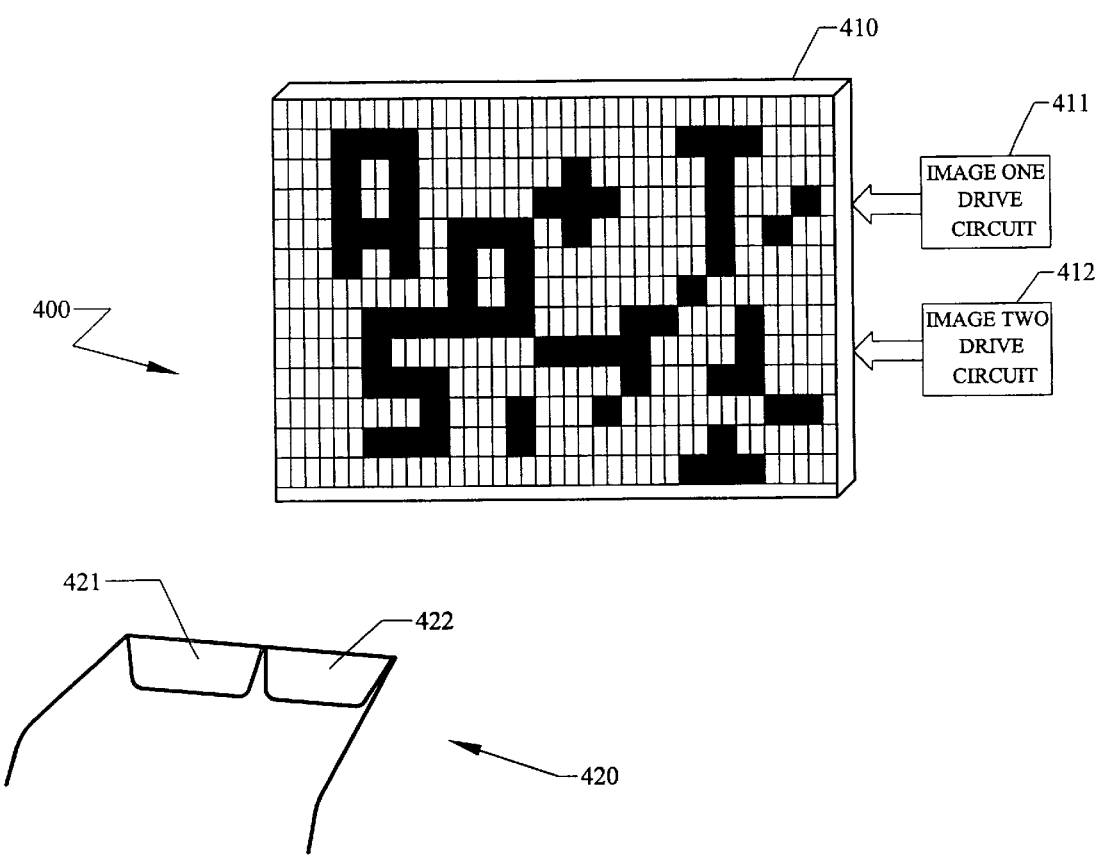
FIG. 4 illustrates a stereographic liquid crystal display system, according to the principles of the present invention.

Turning now to FIG. 4, illustrated is a stereographic liquid crystal display system 400 in accordance with the principles of the present invention. The display system 400 includes a liquid crystal display panel 410 constructed according to the principles described hereinabove; i.e., the display panel 410 includes first and second sets of independent cells containing liquid crystal materials having first and second polarities, respectively. In one embodiment, independent drive circuits 411 and 412 provide drive signals to pixels corresponding to the first and second sets of independent cells, respectively, whereby two interleaved images can be simultaneously displayed on display panel 410. In an alternative embodiment, a single multi-plexed drive circuit may be employed. Those skilled in the art are familiar with various drive circuits and multi-plexing techniques; the principles of the present invention are not limited to a particular circuit or method for driving the display panel 410, all such circuits and methods being within the scope of the claims recited hereinafter.

The stereographic liquid crystal display system 400 further includes a display viewing apparatus 420 which, in one embodiment, comprises "3-D" eyeglasses. The display viewing apparatus 420 includes first and second polarizing lenses 421, 422 having polarities corresponding to the first and second polarities of the first and second sets of independent cells of display panel 410.

In a preferred embodiment, the first and second polarities are left-hand circular polarity and right-hand circular polarity, whereby a user can perceive a first image, through lens 421, and a second image, through lens 422, which together form a stereoscopic image.

From the foregoing, those skilled in the art will recognize that the present invention provides a liquid crystal display that can produce stereoscopic images. When a viewer observes the stereoscopic image with appropriate polarizing filters (such as may be provided in the form of eyeglasses), light of one polarization is provided to one eye and light of another polarization is provided to the other eye. Depending upon what pictorial information is provided to the liquid crystal display to image, the viewer may perceive the result as a three-dimensional image, significantly enhancing the utility and aesthetic appeal of the image.

Although the present invention and its advantages have been described in detail, those skilled in the art should understand that they can make various changes, substitutions and alterations herein without departing from the spirit and scope of the invention in its broadest form.

What is claimed is:

1. A stereographic liquid crystal display (LCD), comprising:
    first and second substrates having a channel wall structure located in an interstice between said first and second substrates that defines first and second pluralities of independent channels in said LCD;
    a first controllable liquid crystal (CLC) material located in said first plurality of independent channels, said first CLC material selectively exhibiting an "on" state and an "off" state and having a first polarity when in said "on" state; and
    a second CLC material located in said second plurality of independent channels, said second CLC material selectively exhibiting an "on" state and an "off" state and having a second polarity when in said "on" state, said first and second CLC materials selectively driveable to cause said LCD to present a stereogram to a viewer when viewed through first and second polarizing lenses having polarities corresponding to said first and second polarities, respectively.

2. The LCD as recited in claim 1 wherein said first polarity is left-hand circular and said second polarity is right-hand circular.

3. The LCD as recited in claim 1 wherein fluid fill ports corresponding to said first plurality of independent channels are on an opposite end of said LCD from fluid fill ports corresponding to said second plurality of independent channels.

4. The LCD as recited in claim 1 wherein said first and second pluralities of independent channels form columns of said LCD.

5. The LCD as recited in claim 1 wherein said channel wall structure comprises a single serpentine wall, said first and second pluralities of independent channels having fluid fill ports on opposing ends of said LCD.

6. The LCD as recited in claim 1 wherein said first plurality of independent channels are adapted to be filled with said material independently from said second plurality of independent channels.

7. The LCD as recited in claim 1 wherein said first and second substrates are flexible.

8. The LCD as recited in claim 1 wherein said independent channels are sufficiently narrow to be filled by means of capillary action.

9. A method of manufacturing a stereographic liquid crystal display (LCD), comprising the steps of:
    providing a channel wall structure in an interstice between first and second substrates, said channel wall structure defining first and second pluralities of independent channels in said LCD;
    filling said first plurality of independent channels with a first controllable liquid crystal (CLC) material, said first CLC material selectively exhibiting an "on" state and an "off" state and having a first polarity when in said "on" state; and
    filling said second plurality of independent channels with a second CLC material, said second CLC material selectively exhibiting an "on" state and an "off" state and having a second polarity when in said "on" state, said first and second CLC materials selectively driveable to cause said LCD to present a stereogram to a viewer when viewed through first and second polarizing lenses having polarities corresponding to said first and second polarities, respectively.

10. The method as recited in claim 9 wherein said first polarity is left-hand circular and said second polarity is right-hand circular.

11. The method as recited in claim 9 wherein fluid fill ports corresponding to said first plurality of independent channels are on an opposite end of said LCD from fluid fill ports corresponding to said second plurality of independent channels, said method further comprising the step of sealing said fluid fill ports.

12. The method as recited in claim 9 wherein said first and second pluralities of independent channels form columns of said LCD.

13. The method as recited in claim 9 wherein said step of providing a channel wall structure comprises the step of forming a single serpentine wall structure on a surface of said first substrate, said first and second pluralities of independent channels having fluid fill ports on opposing ends of said LCD when said first and second substrates are bonded together with said channel wall structure in an interstice formed therebetween.

14. The method as recited in claim 9 wherein said first plurality of independent channels are adapted to be filled with said material independently from said second plurality of independent channels, said steps of filling occurring sequentially.

15. The method as recited in claim 9 wherein said first and second substrates are flexible.

16. The method as recited in claim 9 wherein said independent channels are sufficiently narrow to be filled by means of capillary action, said steps of filling comprising the step of exposing said independent channels to a vacuum.

17. A method of operating a stereographic liquid crystal display (LCD), comprising the steps of:

providing a first drive signal to a first controllable liquid crystal (CLC) material located in a first plurality of independent channels located between first and second substrates, said first CLC material selectively exhibiting an "on" state and an "off" state and having a first polarity when in said "on" state; and providing a second drive signal to a second CLC material located in a second plurality of independent channels located between said first and second substrates, said second CLC material selectively exhibiting an "on" state and an "off" state and having a second polarity when in said "on" state, whereby said first and second CLC materials are selectively driveable to cause said LCD to present a stereogram to a viewer when viewed through first and second polarizing lenses having polarities corresponding to said first and second polarities, respectively.

18. The method as recited in claim 17 wherein said first polarity is left-hand circular and said second polarity is right-hand circular.

19. The method as recited in claim 17 wherein fluid fill ports corresponding to said first plurality of independent channels are on an opposite end of said LCD from fluid fill ports corresponding to said second plurality of independent channels, said method further comprising the step of sealing said fluid fill ports.

20. The method as recited in claim 17 wherein said first and second pluralities of independent channels form columns of said LCD.

21. The method as recited in claim 17 wherein said first plurality of independent channels are adapted to be filled with said material independently from said second plurality of independent channels, said steps of filling occurring sequentially.

22. The method as recited in claim 17 wherein said first and second substrates are flexible.

23. The method as recited in claim 17 wherein said independent channels are sufficiently narrow to be filled by means of capillary action, said steps of filling comprising the step of exposing said independent channels to a vacuum.

* * * * *

UNITED STATES PATENT AND TRADEMARK OFFICE
CERTIFICATE OF CORRECTION

PATENT NO. : 6,020,941
DATED : February 1, 2000
INVENTOR(S) : Yao-Dong MA

It is certified that error appears in the above-identified patent and that said Letters Patent is hereby corrected as shown below:

On the title page, item [54] and Column 1:
  Title: "STEROGRAPHIC LIQUID CRYSTAL DISPLAY EMPLOYING SWITCHABLE LIQUID CRYSTAL MATERIALS OF TWO POLARITIES IN SEPARATE CHANNELS" should be --STEROGRAPHIC LIQUID CRYSTAL DISPLAY AND METHODS OF MANUFACTURE AND OPERATION THEREOF--

Signed and Sealed this

Ninth Day of January, 2001

Attest:

Q. TODD DICKINSON

Attesting Officer

Commissioner of Patents and Trademarks